United States Patent
Cummings

[19]

[11] Patent Number: 6,039,216
[45] Date of Patent: Mar. 21, 2000

[54] POSITIVE DISPLACEMENT MULTICHAMBER PUMP DISPENSER

[75] Inventor: Bruce Cummings, New York, N.Y.

[73] Assignee: Colgate-Palmolive Company, New York, N.Y.

[21] Appl. No.: 09/215,117

[22] Filed: Dec. 18, 1998

Related U.S. Application Data

[60] Provisional application No. 60/070,540, Jan. 6, 1998.

[51] Int. Cl.⁷ ........................................................ B67D 5/52
[52] U.S. Cl. ............................................ 222/137; 222/327
[58] Field of Search ..................................... 222/405, 162, 222/135, 386, 137, 566, 319, 320, 327

[56] References Cited

U.S. PATENT DOCUMENTS

| | | | |
|---|---|---|---|
| 4,109,833 | 8/1978 | Gross | 222/137 |
| 5,020,694 | 6/1991 | Pettengill | 222/137 |
| 5,332,124 | 7/1994 | Cancro et al. | 222/137 |
| 5,645,193 | 7/1997 | Gentile | 222/137 |
| 5,881,921 | 3/1999 | Seager et al. | 222/137 |
| 5,950,873 | 9/1999 | Williams et al. | 222/137 |

FOREIGN PATENT DOCUMENTS

| | | |
|---|---|---|
| 2 483 366 | 12/1981 | France . |
| 2 708 574 | 2/1995 | France . |
| 295 15 380 | 1/1996 | Germany . |
| 2 079 379 | 1/1982 | United Kingdom . |
| 97/11896 | 4/1997 | WIPO . |

*Primary Examiner*—Kevin Shaver
*Assistant Examiner*—Melvin Cartagena
*Attorney, Agent, or Firm*—Michael McGreal

[57] ABSTRACT

The positive displacement pump delivers the products uniformly and with a low force to actuate the pump. The uniform delivery results from a close slideable fitting of the upper part into the lower part. A low force to actuate is accomplished in part by reduced surface area contact of the upper portion and lower portion during slideably interfitting operation. This is accomplished preferably by having transverse ribs on the exterior surface of the upper part and longitudinal ribs on the interior surface of the lower part. As a result the contact of the upper part and lower part during use is a transverse rib/longitudinal rib contact. The longitudinal ribs preferably are parallel to the vertical axis of the base with no draft angle. Further, there is a locking mechanism between the an upper part shroud and rams located in the lower part. The locking mechanism controls the movement of the reusable shroud. The locking mechanism is comprised of at least one arm on a lower part of the upper shroud, this at least one arm contacting the upper region of at least one of the rams of the lower part. Additionally there are reinforcing ledges on the lower region of the upper shroud and on the upper region of the lower shroud. The reinforcing ledge on the upper shroud can extend to comprise a floor on the upper shroud. Yet further the spout of the dispenser has a structure where the region of narrowest cross-section is intermediate the ends of the spout. This structure decreases the drag on the material flowing through the spout and thus further decreases the force to actuate the pump.

27 Claims, 8 Drawing Sheets

POSITIVE DISPLACEMENT MULTICHAMBER PUMP DISPENSER

This Application the benefit of the U.S. Provisional No. 60/070,540, filed Jan. 6,1998.

FIELD OF THE INVENTION

This invention relates to a multichamber positive displacement pump dispenser that has more vertical stability by means of a more stable shroud relationship of an upper shroud portion and a base shroud portion. This invention further relates to a multichamber pump dispenser that requires a reduced force to actuate due to a lower degree of friction between the upper shroud portion and the base shroud portion and spout structure. The invention additionally relates to a multichamber pump dispenser that has an increased structural integrity of both the upper shroud portion and the lower shroud portion.

BACKGROUND OF THE INVENTION

A positive displacement pump dispenser is one which is actuated by a hand applied downward force to an upper portion of the dispenser to cause rams located in a bottom portion to contact and move pistons in product containing cylindrical chambers located in the upper portion upwardly to thereby dispense the products in the chambers from the dispenser. This is in contrast to vacuum actuated pump dispensers where pistons in the product containing cylinders move upwardly by means of a vacuum being formed in each chamber during the dispensing operation, the vacuum causing each piston to move upwardly to dispense the products from the dispenser. Positive displacement pump dispensers have been found to be very effective for the delivery of multiple products from multiple chambers. They usually have a lower cost. Fewer parts are required, including valves. Vacuum actuated pump dispensers usually require two valves for each product chamber to create the vacuum in each chamber necessary for dispensing. This increases the number of parts and consequently the cost of the dispenser.

The prior art with regard to positive displacement multichamber pump dispensers is exemplified by U.S. Pat. No. 3,166,221, European Patent 292,672, U.S Pat. No. 5,020,694 and U.S Pat. No. 5,038,963. In U.S Pat. No. 3,166,221 there is an upper product chamber and a lower base having a ram to fit into each upper product chamber. The pistons that slideably fit into the product chambers are an integral part of the rams. The upper product chamber and the lower base do not have any structure to increase the stability of the upper part in the base part nor any structure to decrease the force to actuate the dispenser. Likewise in U.S Pat. No. 5,020,694 the pistons are a part of the rams. Conceptually, this dispenser is similar to that of U.S Pat. No. 3,166,221. In European Patent 294,672 the pistons are not attached to the rams but rather form the bottom closure of the product chambers. In U.S. Pat. No. 5,038,963 there is disclosed a multichamber pump dispenser with improved features over the dispenser of U.S Pat. No. 5,020,694, but there is no structure to increase stability during use nor any means to reduce the force to actuate. Also there is no structure to enhance the structural integrity of the dispenser. Regardless of these deficiencies, these references evidence the present state of the art of multichamber pump dispensers.

One problem faced by those developing multichamber pump dispensers is the uniform dispensing from each chamber. Another problem is to maintain a low force to actuate the pump. The first problem can be solved by maintaining close tolerances between the interfitting sliding pieces. The second problem can be solved by minimizing the contact areas of the interfitting pieces. However, these are contrary solutions. Generally, close tolerances will require more contact of interfitting parts. This will reduce the variance between the parts and thus, the tendency of one part to move irregularly into the other, but it will increase friction and the force to actuate. The solution to one problem will have a negative effect of the other problem. Uniquely, the present invention solves both problems. There is a more uniform dispensing and a decrease in the force to actuate.

Another problem that is solved is a positive locking system of the upper portion of the dispenser and the base portion. This is accomplished by a mechanism that extends from a lower part of an upper shroud to at least one of the rams of the base portion. This provides for a concealed, positive locking mechanism to lock the upper shroud in an extended position. It also will prevent the upper shroud from being fully disengaged from the base portion during use or during the replacement of the product chambers with refill unit product chambers.

Another problem that is solved is to increase the rigidity of the dispenser parts. This is accomplished for an upper shroud by having an inwardly projecting ledge at the base of the upper shroud. In a preferred embodiment this ledge forms a floor at the base of the upper shroud. For the base lower shroud this is an inwardly projecting ledge at the upper edge of the base lower shroud which substantially rigidifies the base shroud.

A further problem that is solved is the reduction in the drag of the products from each chamber in passage through spout conduits to the spout exit. This is accomplished by the diameter of each conduit being greater in cross-sectional area adjacent the product chambers and at the spout exit. Intermediate the product chambers and the spout exit, the channels decrease in cross-sectional area and then increase in cross-sectional area to the spout exit. The cross-sectional area increases by means of the walls opposite the spout divider wall diverging outwardly. This shape of these conduits produces a decreased drag of the products by the conduit walls.

The present dispenser design solves these and other problems. The unique design provides a multichamber pump dispenser that uniformly dispenses the products from each chamber at a low force to actuate. There also is a unique locking mechanism of the upper portion and the lower portion and an increase in the rigidity of the primary dispenser parts. Additionally there is less drag in the dispenser spout which further reduces the force to actuate. These are useful commercial advantages of this dispenser.

BRIEF SUMMARY OF THE INVENTION

The present invention is directed to multichamber pump dispensers that uniformly dispense products from each chamber, have a low force to actuate, have a concealed, positive locking mechanism of the upper portion and the lower portion and which provide for a rigid pump structure at no increase in the amount of plastic used. The structure to uniformly dispense product and simultaneously minimize the force to actuate is particularly unique since it addresses competing factors and gets a positive result for each.

The multichamber pump structure comprises an upper portion and a base portion. The upper portion has an upper shroud and a plurality of product chambers contained within the upper shroud. Each product chamber has an upper end connected by a delivery channel to an exit. The lower end of each chamber is closed by a piston. This upper shroud which contains the product chambers has a plurality of transverse projections on the outer surface of the shroud. Preferably the projections at least substantially surround the upper shroud and most preferably are in a wave-like pattern. The lower base portion has a lower support foot with a plurality of upwardly extending rams. Each ram is aligned to enter a product chamber of the upper portion and to contact the piston of that chamber. Surrounding the rams is a base lower shroud. On the inner surface of the base lower shroud there are a plurality of longitudinal ribs. These ribs can be vertical or at an angle. The surface of each of these ribs is equidistant from the vertical axis of the base portion throughout its length. There is no draft tolerance on these longitudinal ribs. That is they each can have the same lateral dimension throughout their length.

In addition, in one embodiment the upper shroud and at least one of the rams in the lower portion cooperate to form a locking mechanism of the upper portion and the lower base portion. The upper shroud has at least one inwardly projecting arm on a lower region of the shroud, this arm contacting a projection in the region of the upper of at least one ram to thereby maintain the upper portion in an extended position above the lower base portion. This will prevent the upper shroud from being disengaged from the base lower shroud during the replacement of product cartridges in the upper shroud.

In a second embodiment the upper shroud is prevented from being unintentionally removed from the lower shroud by one or more latch projections on a lower part of the exterior surface of the upper shroud, which projections contact an inwardly extending ledge on the lower shroud. The resulting latching prevents the disengagement of the two shrouds. In addition there are one or more smaller interference projections located above the latch projections to hold the upper shroud at a given position. There then is needed an additional force to save the upper shroud pass down into the base lower shroud. The force is greater than that needed to insert the product cartridge into the upper shroud. In this way the product cartridge can be inserted into the upper shroud without the upper shroud also moving down into the base lower shroud.

Further the rigidity of the upper shroud and a base lower shroud are increased by the inwardly extending ledge in the region of the upper part of the base lower shroud and the region of the bottom of the upper shroud. In a preferred embodiment this ledge on the upper shroud is a continuous floor, with product chamber openings extending through this floor. The inwardly projecting ledges of each shroud serve to increase the rigidity of the upper shroud and the base lower shroud. This increases the rigidity of the entire pump dispenser.

In addition, the structure of the spout conduits decreases the force to actuate by decreasing the drag of the product flowing through the conduits. This is accomplished by a large cross-sectional area adjacent the product chambers, then a decreased cross-sectional area, followed by an increased cross-sectional area. Further the outer wall of the spout extends outwardly near the spout exit while the inner conduit divider wall remains constant in shape.

The present invention solves the problem of uniform dispensing at a low force to actuate by maintaining uniform dimensions for the transverse projections on the upper shroud and for the substantially longitudinal ribs on the base portion. These transverse projections and longitudinal ribs are formed without any draft angle that usually is necessary in molding plastic pieces. Draft angle is the slight angle to a surface needed in order to remove an article from a mold. Since there is no draft to the projections and ribs, all projections and ribs throughout their linear dimension have the same height (outwardly extending dimension). The result is a close tolerance throughout the interfitting of the upper shroud into the base lower shroud. In addition, by having only a transverse projection and longitudinal rib contact, the contact surface of the upper shroud and the base lower shroud is significantly reduced with a reduction in shroud to shroud friction and thus, a significantly decreased force to actuate. The use of a combination of transverse projection/longitudinal rib contact and the present spout design solves to a large degree both the uniform dispensing and force to actuate problems.

The present invention also solves the problem of providing a reasonably rigid dispenser while conserving materials. This is accomplished by ledges at the bottom region of the upper shroud and the upper region of the base lower shroud. There likewise is solved the problem of locking the upper portion and the lower portion. These and other problems are solved in the present dispenser.

DETAILED DESCRIPTION OF THE DRAWINGS

Figure 1:
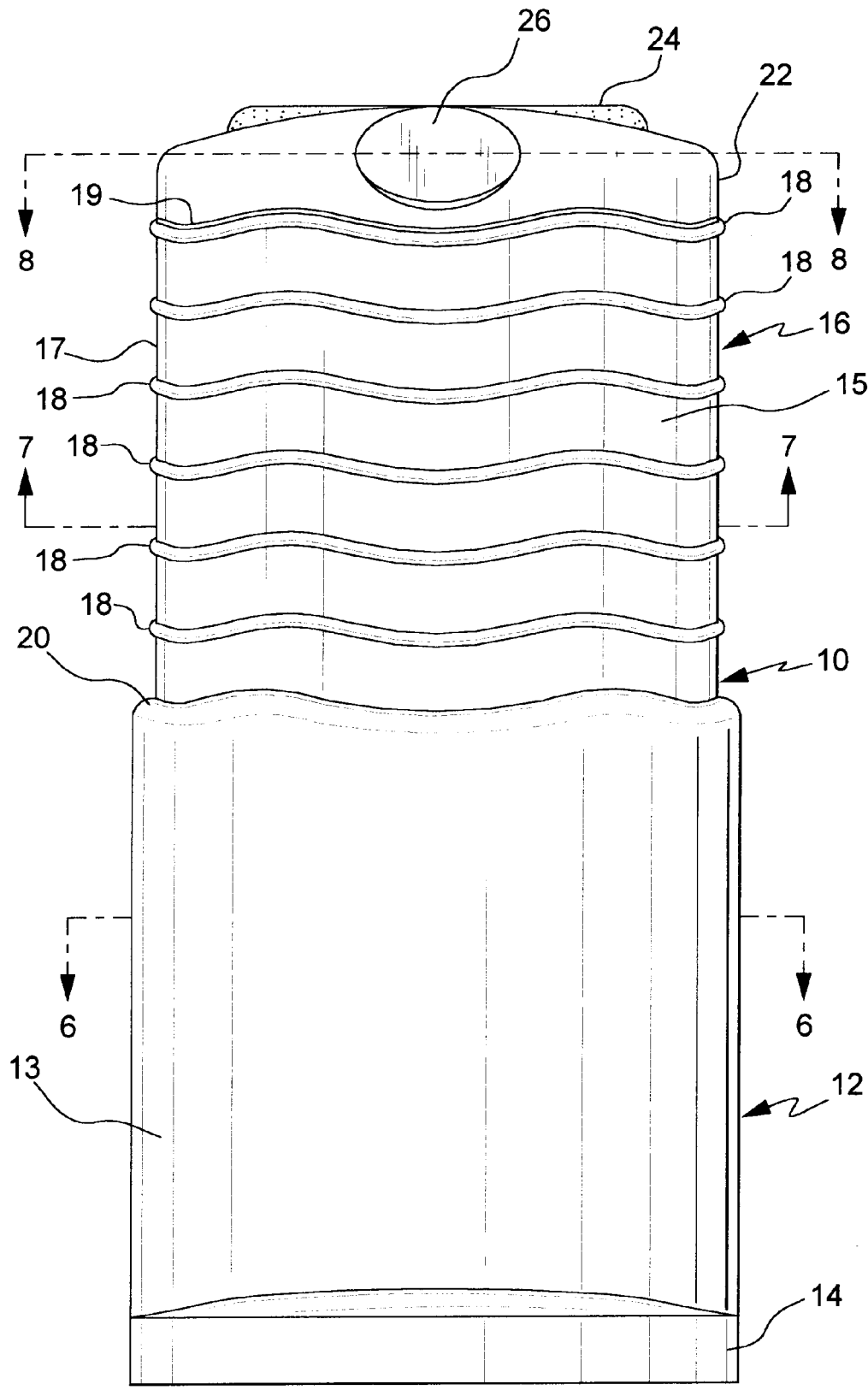
FIG. 1 is a front elevation view of the multichamber pump dispenser.

The pump dispenser will be described in more detail with reference to the drawings. FIG. 1 is a front elevation view of the dispenser. The dispenser 10 is comprised of the base portion 12 and the upper portion 16. The base portion has a foot area 14 and a shroud 13 and is usually of a circular or generally elliptical (oval) shape. A generally elliptical shape is a preferred shape. The upper portion 16 slideably fits into the base portion 12 at the edge 20 of the base portion. The edge 20 preferably will have a pattern to be symmetrical to the transverse projections 18 of the upper portion 16. Preferably these are continuous projections. However they can be intermittent and can be of essentially of any shape that would provide sufficient contact with longitudinal ribs in the base portion. Preferably these are continuous rib projections and are spaced so that at least two rib projections are in contact with the longitudinal ribs in the base portion during use.

The upper portion 16 is comprised of shroud 17 which carries a plurality of transverse projections 18. The projections 18 can circumscribe hoops partially or fully around the upper shroud 17 or can be in a wave pattern partially or fully around the shroud 17. Hoops would be in essentially the same horizontal plane. A wave type pattern is not in the same horizontal plane and is preferred. It also is preferred that the rear surface of the shroud 17 have an area free of projections for an informational label. The upper portion 16 terminates in a head piece cartridge 22 which has an upper surface 24 which is comprised primarily of a raised push pad. The head piece cartridge 22 also carries the spout 26. The head piece cartridge fits into the upper shroud 17. The parting line of the head piece cartridge 22 from the upper shroud 17 is designated as 19. The head piece cartridge 22 is removable from upper shroud 17.

Figure 2:
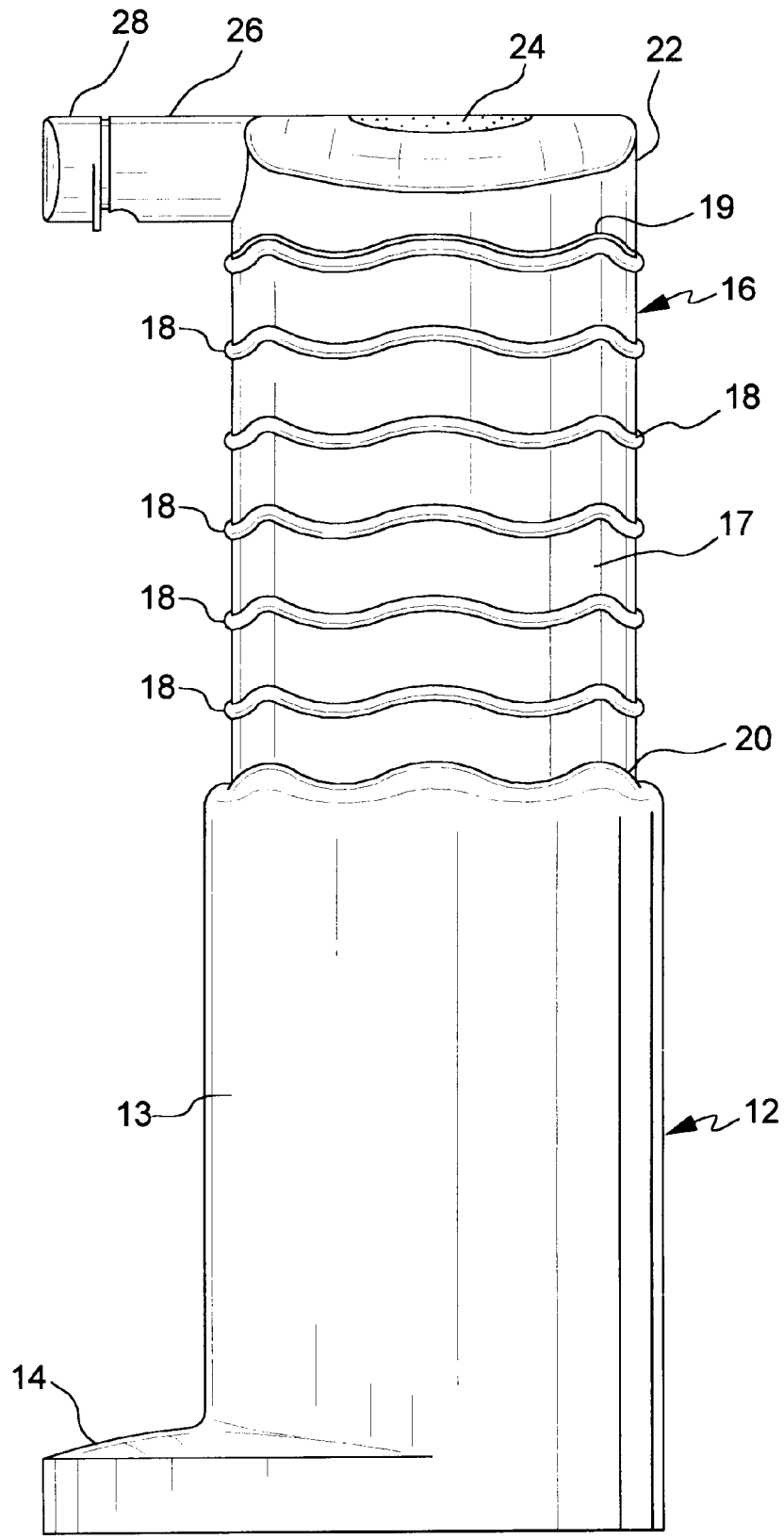
FIG. 2 is a side elevation view of the multichamber pump dispenser.

FIG. 2 shows the right and left side of the dispenser. This view shows the embodiment of the projections 18 extending around to the side surfaces form the front surface. The preferred wave shape of the projections is preferably continued onto the side surfaces. However, as noted, these projections can be of essentially any shape such as of a hoop shape with the projection being in the same horizontal plane. They also can be discontinuous. Also shown in this view is closure 28 on spout 26.

Figure 3:
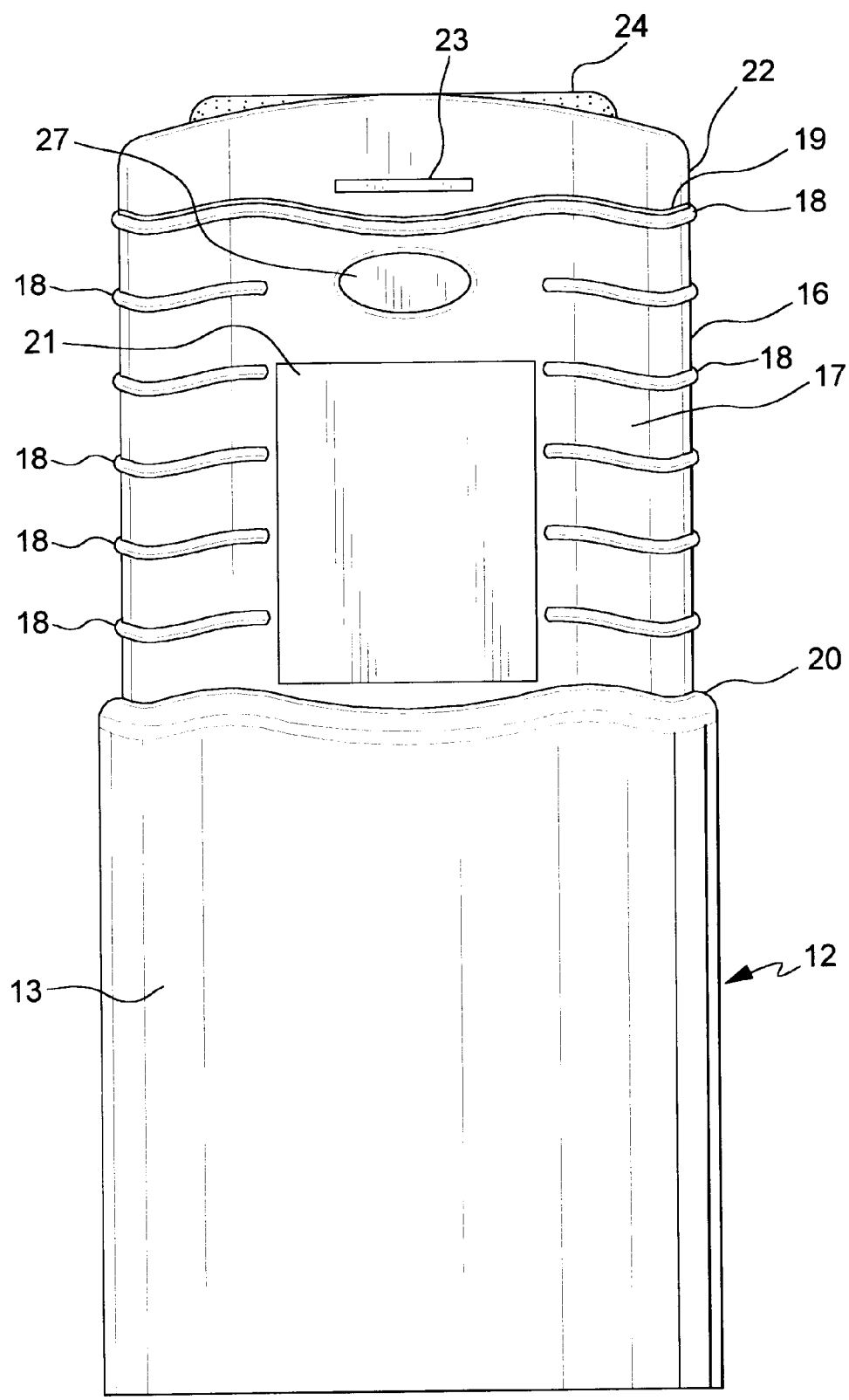
FIG. 3 is rear elevation view of the multichamber pump dispenser.

FIG. 3 is a rear elevation view of the pump dispenser. This view shows the projections 18 extending onto the rear surface. The projections continue the wave shape. However, they can be of a straight or other shape on this surface. There is shown an area 21 without projections for the placement of an informational label. Also shown is slot 23 in the head piece cartridge 22 for locking the head piece cartridge to the upper shroud 17. A compatible projection 25 (see FIG. 9) on the shroud will enter slot 23 and lock the head piece cartridge 22 to the upper shroud 17.

Figure 4:
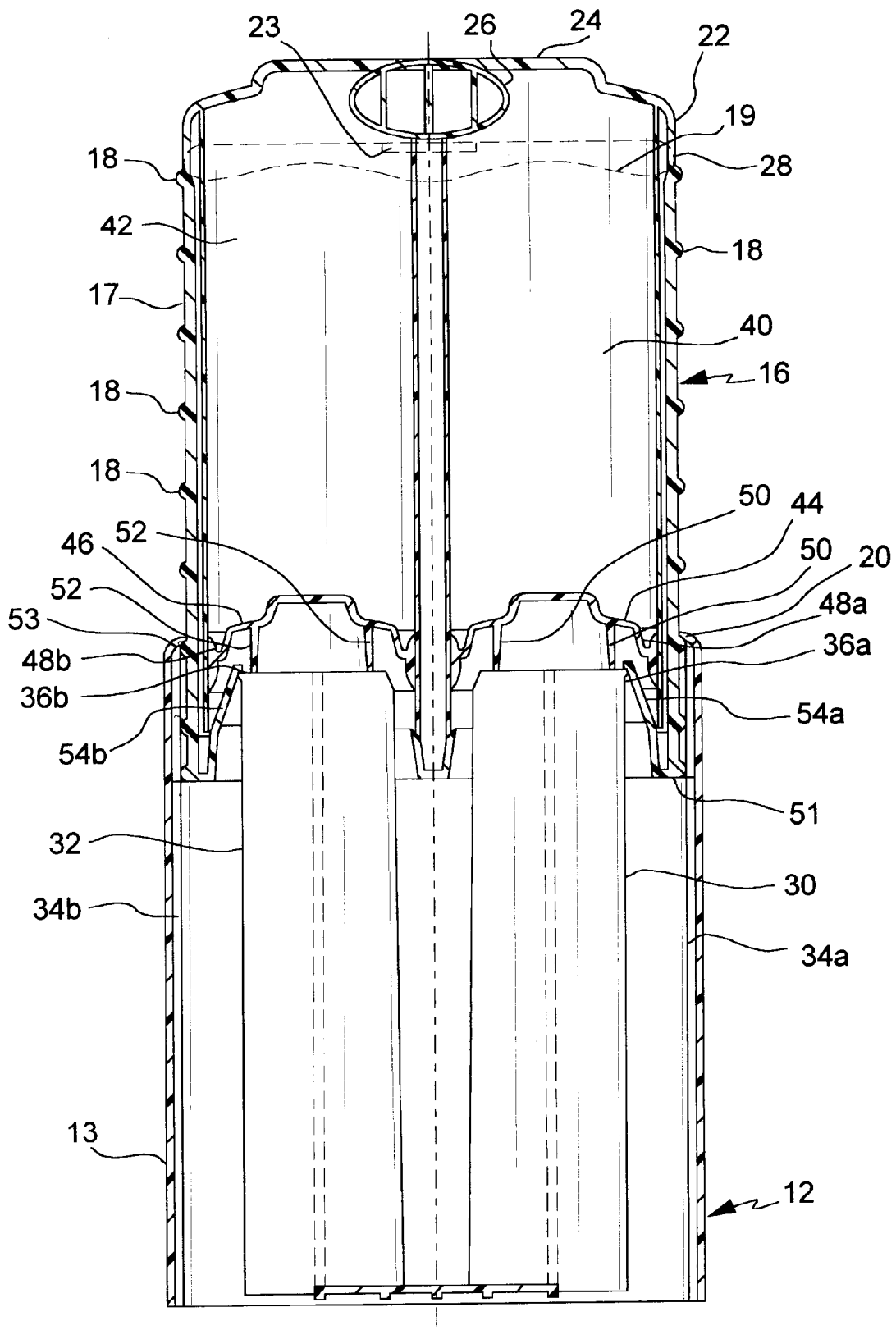
FIG. 4 is a front elevation view in cross-section of the multichamber pump dispenser.

FIG. 4 is a front longitudinal cross-sectional view of the pump dispenser. The base is shown with rams 30 and 32 extending upward from the foot section 14. Extending outward from the inner surface are longitudinal ribs 34(*a*) and 34(*b*). These longitudinal ribs can number from 2 to 10 or more and are usually parallel to the vertical axis of the base. The use of 4 to 6 longitudinal ribs is preferred. There is no molding draft angle on these ribs, although there can be a molding draft angle on the wall of lower shroud 13. By being able to delete a draft angle on these ribs, there will be a closer tolerance in the interfitting of the upper shroud 17 into the base lower shroud 13. These ribs can be parallel to the vertical axis of the lower portion throughout their entire length or can be at an angle. The surface of each rib preferably will be equidistant from the vertical axis of the lower portion throughout the length of each rib. This is the case whether the rib is vertical or at angle to vertical. In a most preferred embodiment the surfaces of the ribs will be parallel to each other and to the vertical axis of the lower portion of the dispenser.

The upper part of each ram (30 and 32) in a preferred embodiment is shaped to accommodate a locking lever depending from a lower region of the upper shroud 17. However, there can be a locking projection or other shape on only one of the rams. In one preferred embodiment each ram has a locking projection 36(*a*) or 36(*b*) for this purpose. Upon the interfitting of the upper shroud 17 into the base lower shroud 13, lever arms 54(*a*) and 54(*b*) depending from a lower region of shroud 17 will contact projections 36(*a*) and 36(*b*) as is shown in FIG. 2. The upper portion 16 will be held at this extended position with respect to the lower portion 12 until an additional force is applied. When this occurs, lever arms 54(*a*) and 54(*b*) pass by the projections 36(*a*) and 36(*b*). The dispenser will be shipped and sold as shown in FIG. 2. The consumer will, by the use of an additional force, cause the lever arms to pass projections 36(*a*) and 36(*b*). The pump dispenser then is in a pumping mode and ready for use. Also in this position the lever arms cannot pass upwardly by the projections 36(*a*) and 36(*b*) so the upper shroud 17 cannot be removed from the lower shroud 13.

The upper portion 16 of the pump dispenser holds the head piece cartridge 22 which has the product chambers 40 and 42 which usually are cylindrical in shape. Each of these cylinders is connected at the upper end to a channel which flows each product separately to and through spout 26. The lower end of chamber 40 is closed by piston 44 and the lower end of chamber 42 is closed by piston 46. The pistons have an upper domed shape to conform to the shape of the upper surface of each chamber. This insures the complete emptying of each chamber. Contact portions 48(*a*) and 48(*b*) of each piston 44 and 46, respectively, slideably contact the wall of each chamber providing a seal of the piston against the chamber wall. Piston supports 50 and 52 contact rams 30 and 32 respectively.

Also shown in this view is inwardly projecting ledge 51 on the upper shroud 17. This inwardly projecting ledge serves to reinforce the lower edge of the shroud 17. As is seen in this FIG. 4 and in FIG. 5 this ledge in a preferred embodiment forms a floor at the bottom of the shroud 17 with apertures for the rams 30 and 32 to pass upwardly into each product chamber and to contact the pistons in each product chamber. This ledge can be of any shape and configuration from a small ring peripheral ledge to essentially a full floor. The lower shroud 13 at the upper region has an inwardly projecting ledge 53. Likewise as with ledge 51, this ledge 53 is a reinforcing ledge and is used here to increase the rigidity of the base lower shroud 13. By increasing the rigidity of the upper shroud 17 and the base lower shroud 13 there will be a more vertical travel of the upper part into the lower part and thus more uniform dispensing of the products in each chamber. The ledge 53 can extend fully around lower shroud 13 or primarily be in the curved areas.

Figure 5:
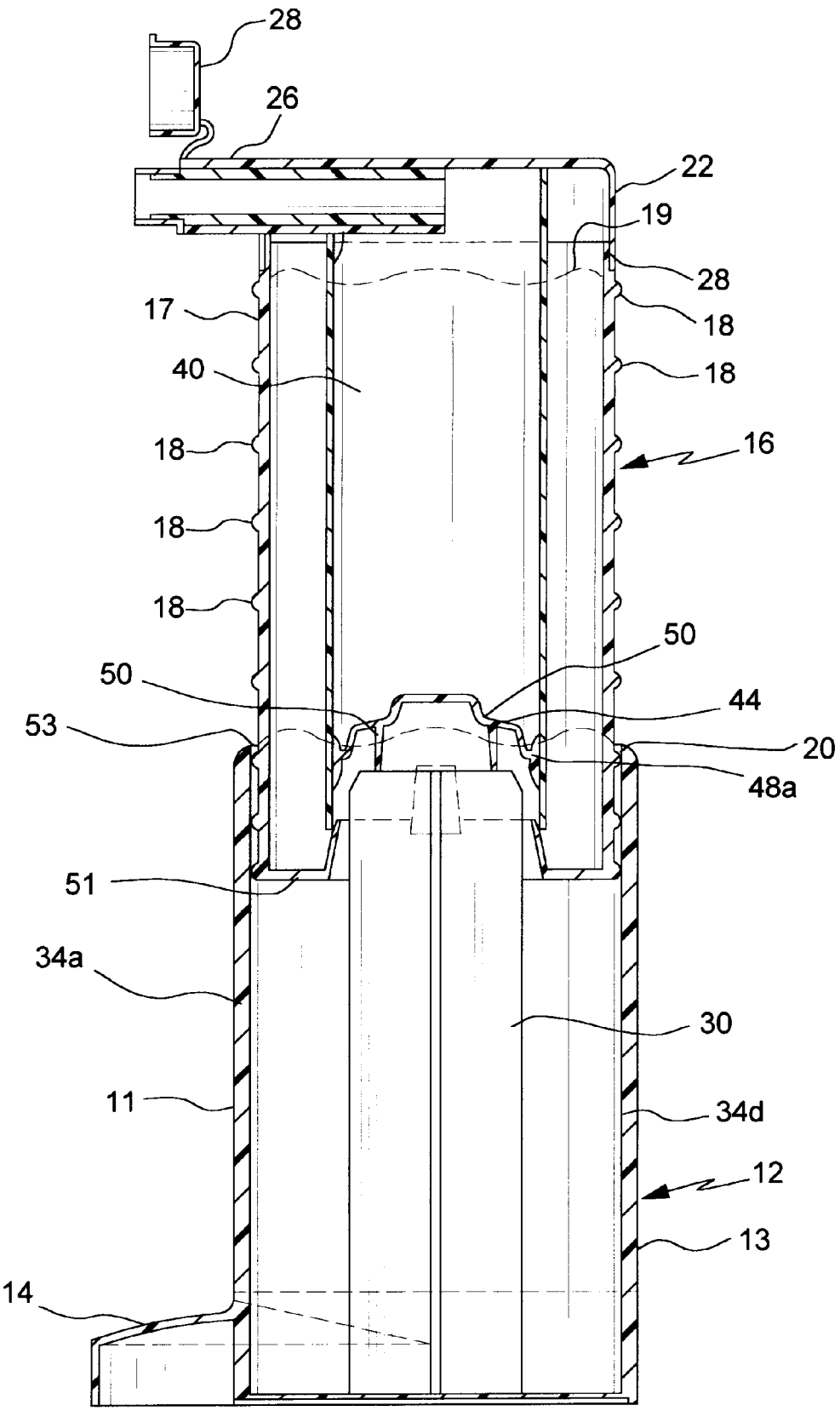
FIG. 5 is a side elevation view in cross-section of the multichamber pump dispenser.

Shown in this FIG. 4 and in FIG. 5 is the interconnection of the upper shroud 17 to the head piece cartridge 22. This is accomplished by the interfitting of projection 25 (see FIG. 9) of the upper shroud 17 into slot 23 of the head piece cartridge. This arrangement can be reversed with a projection on the head piece cartridge 22 fitting into a slot on the upper shroud 17.

In this arrangement of the upper shroud and the head piece cartridge only the head piece cartridge with the attached product chambers is disposed of and replaced when the products have been fully dispensed from the chamber. The upper shroud remains with the base with a replacement headpiece cartridge with product chambers inserted into the upper shroud.

Figure 6:
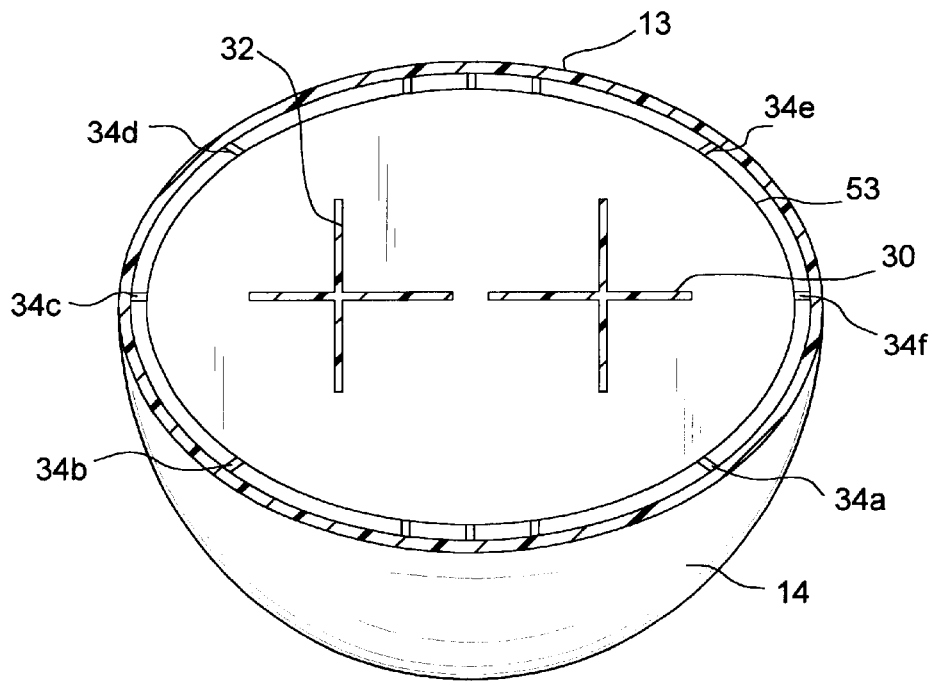
FIG. 6 is a cross-sectional view of the base portion of the multichamber pump dispenser.

FIG. 6 is a horizontal cross-sectional view of the base portion of the pump dispenser. The rams 30 and 32 are shown along with the six longitudinal ribs 34(*a*), 34(*b*), 34(*c*), 34(*d*) 34(*e*) and 34(*f*). As previously noted, these longitudinal ribs do not have any draft. They are parallel to each other and to the vertical axis of the base portion. These longitudinal projections contact the transverse projections 18 on the upper shroud. The transverse projections 18 likewise have no draft from rib to rib or on any rib. The net result is a close sliding fit of the upper shroud 17 into the base lower shroud 13.

Figure 7:
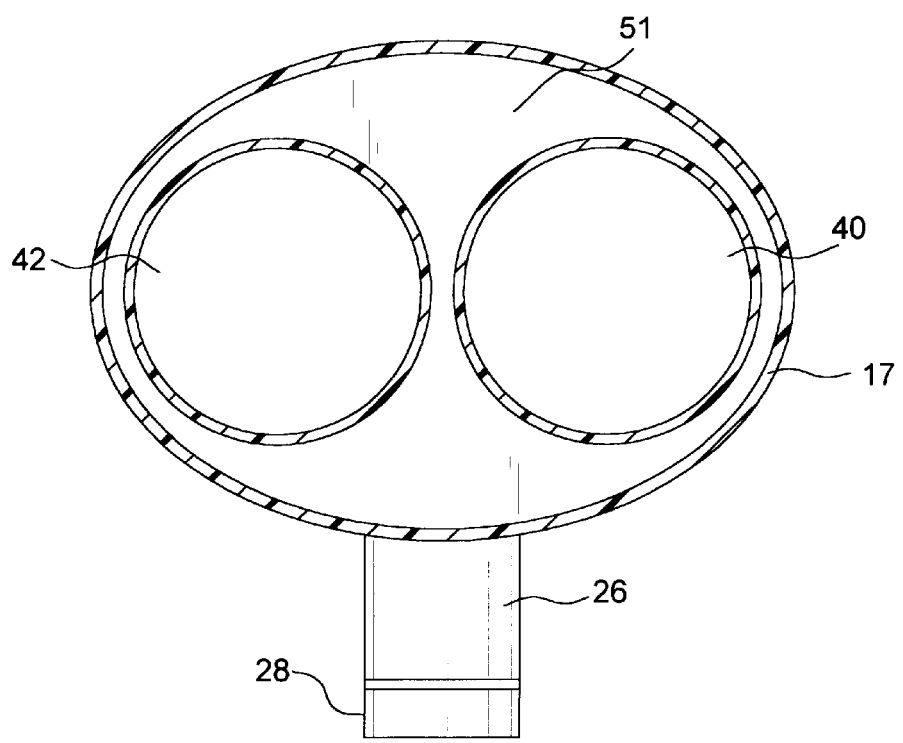
FIG. 7 is a bottom plan view of the base of the upper shroud showing a floor ledge.

FIG. 7 is a bottom plan view of the head piece cartridge 22 with the product chambers 40 and 42. This shows the floor 51 of the shroud 17 and the spout 26 with closure 28.

Figure 8:
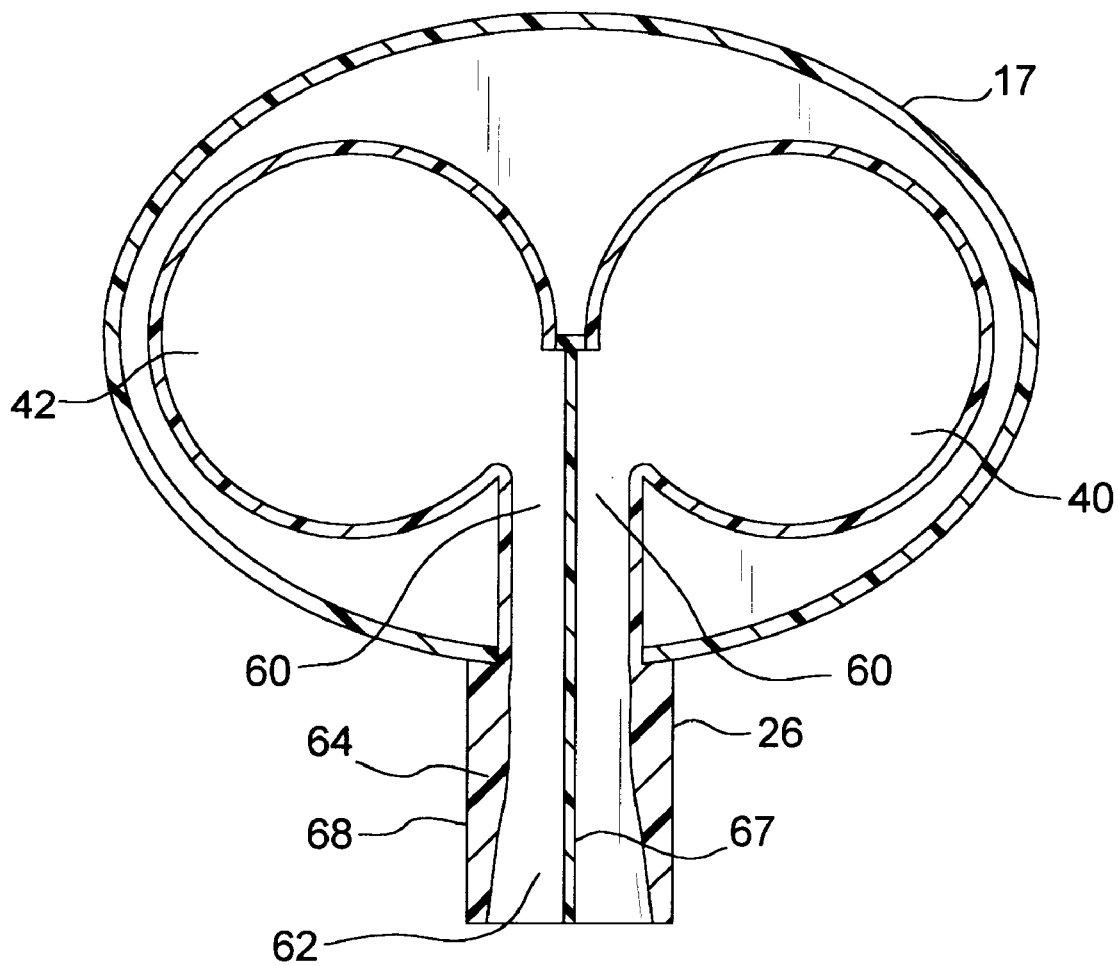
FIG. 8 is a cross-sectional of the spout of the dispenser through line 8—8 of FIG. 1.

FIG. 8 shows the structure of spout 26. In this longitudinal cross-section 8—8 of FIG. 1 it is seen that the cross-sectional area of the product receiving end 60 is less than that of the cross-sectional area of the exit end 62. Intermediate these two points at the necked area 64 the cross-sectional area decreases to less than at end 60 or 62 at the taper section 66. This taper section is preferably a conical section. Between the necked area 64 and exit end 62 the outer wall 68 extends outwardly. The divider wall 67 remains straight throughout its length. The only change in dimension would be a draft angle so that the part can be removed from the mold. The result of this configuration is less drag on the product traveling through the spout. This further decreases the force to actuate the dispenser.

Figure 9:
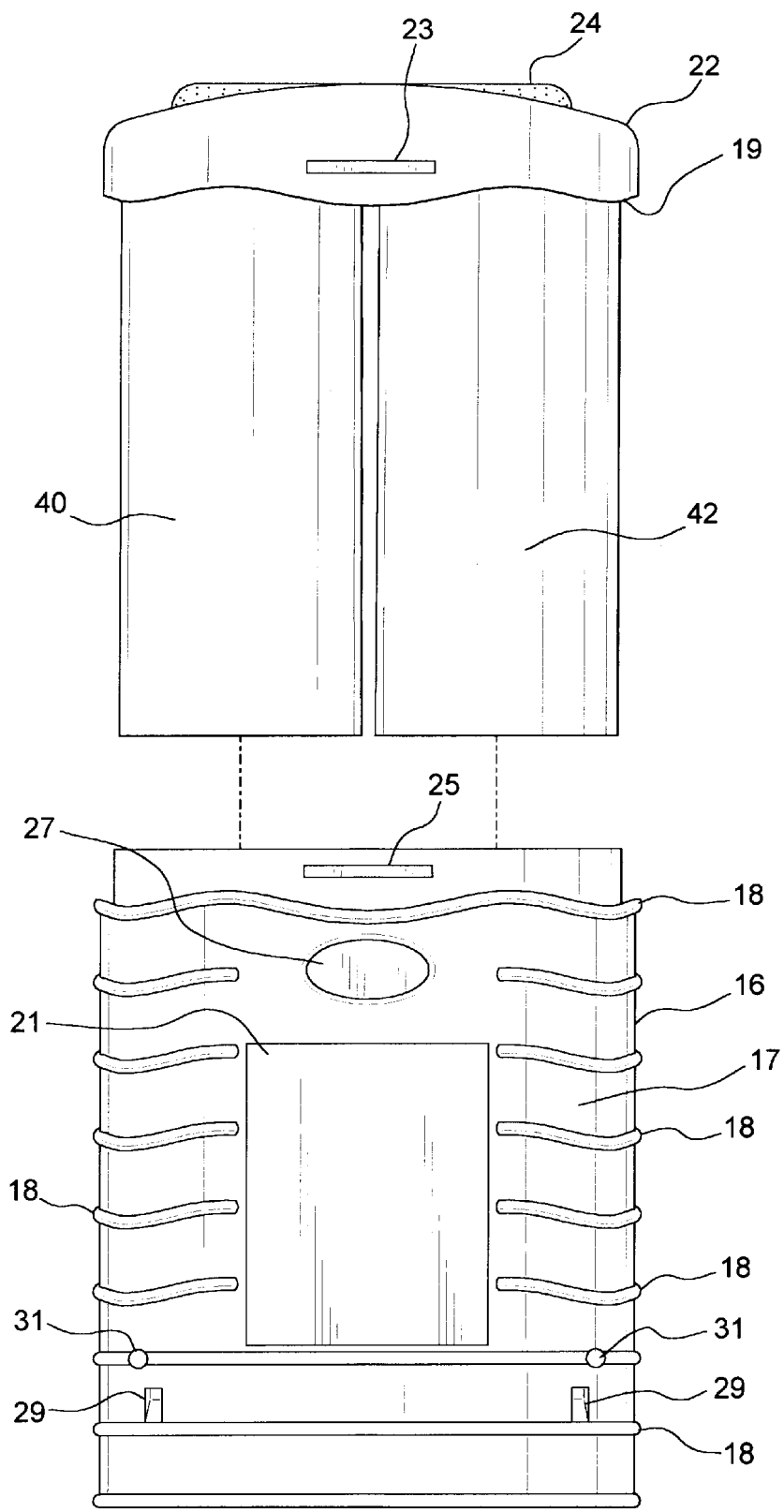
FIG. 9 is an exploded view of the upper portion of the dispenser of FIG. 1 showing external locking projections and other features on the rear of the dispenser.

FIG. 9 shows an exploded view of the upper portion 16 of the dispenser. This view shows the head piece cartridge separated from the upper shroud 17. There is shown here information panel 21 and press panel 27. By pressing inwardly on press panel 27 the projection 25 can be released from slot 23. The locking projections 29 are provided to lock the upper shroud 17 to the lower shroud 13. These locking projections will catch the ledge 53 of the lower shroud and keep the upper shroud locked to the lower shroud. The inference projections 31 are of a dimension that they will pass by ledge 53 of the lower shroud with an additional force. The force that is needed is a force greater than that required for the insertion of the cartridge 22 into the upper shroud 17, and for latching these parts together by means of the projection 23 and slot 25.

The pump dispenser would be purchased as is shown in FIGS. 1 through 5. The upper part would be in the locked position with lever arms 54(a) and 54(b) contacting projections 36(a) and 36(b) of the rams. Upon a downward pressure the lever arms pass by projections 36(a) and 36(b) and product can be dispensed. Product will be dispensed until the chambers are emptied. At this time the head piece cartridge 22 is removed from the upper shroud 16 by disengaging slot 23 and projection 25 and pulling upwards on the head piece. The empty head piece cartridge 22 with the product chambers is discarded and a new head piece cartridge 22 with full product chambers is inserted into the shroud 17. By pushing downward the groove and rib arrangement on the head piece and the upper shroud are locked into place. During this time lever arms 54(a) and 54(b) are maintaining shroud 17 extended above the base portion 12 which carries base lower shroud 13. In a further push downward, the lever arms 54(a) and 54(b) pass by projections 36(a) and 36(b) and the pump dispenser is again in a condition for use.

There is a uniform dispensing from this dispenser due to the close fit of the longitudinal ribs of the base portion and the transverse ribs of the upper shroud. In this way all of the transverse ribs will contact the longitudinal ribs with the same close fitting tolerance. The piston displacement in each product chamber will be equal for a dispensing operation. This also minimizes the force to actuate by minimizing the contact of the interfitting surface of the shroud and the interfitting surface of the base portion during an actuation of the pump dispenser. The contact of the surfaces when the upper shroud is fitted fully into the lower shroud is less than about 20% of the surface area of each shroud, preferably less than about 10%, and most preferably less than about 5%. This is the contact with the product chambers empty and the rams extending fully up into the product chambers. This low surface to surface contact reduces friction and thus, the force to actuate. The pump dispenser more uniformly dispenses product at a low force to actuate.

The pump dispenser can be made from any moldable plastics. These include the polymers such as polyethylene, polypropylene and polybutadiene and their mixtures and copolymers. The product chambers can be produced from the same plastic as the other pump pieces or some the material. Where it is desired that the product chambers have good barrier properties with regard to organics, such as flavor oils, polyethylene terephthalate is a useful material.

There are other advantages other than those enumerated in this specification. However, all modifications to this pump dispenser and all resulting advantages are within the scope of the present invention.

what is claimed is:

1. A multichamber pump dispenser comprising a upper portion and a base portion, said upper portion comprising an upper shroud and a cartridge having a plurality of chambers, each chamber having an upper end and a lower end, the upper end of each chamber connected by a delivery channel to an exit nozzle and another end of each said chambers closed by a piston adapted for slideable movement within each of said chambers, said upper shroud at least partially surrounding said plurality of chambers and having a plurality of transverse projections thereon, a lower portion comprising a base and a plurality of upwardly projecting rams, each of said rams arranged for contact with one of said pistons, and a lower shroud surrounding said rams, said lower shroud having a plurality of longitudinal ribs on an inner surface thereof adapted to contact said plurality of transverse projections when said upper shroud is interfitted into said lower shroud.

2. A multichamber pump dispenser as in claim 1 wherein each of said longitudinal ribs is equidistant from a vertical axis of said base portion throughout the length of each of said longitudinal ribs.

3. A multichamber pump dispenser as in claim 2 wherein there are at least about three said longitudinal ribs.

4. A multichamber pump dispenser as in claim 1 wherein said cartridge is removably attached to said upper portion.

5. A multichamber pump dispenser as in claim 1 wherein said upper shroud has at least one arm projecting from a lower region thereof, said at least one arm contacting at least one ram adjacent an upper part thereof to thereby lock said upper portion into an extended relationship with said base portion.

6. A multichamber pump dispenser as in claim 1 wherein said upper shroud has an inwardly extending ledge in a lower region thereof.

7. A multichamber pump dispenser as in claim 6 wherein said inwardly extending ledge forms a continuous floor with an aperture for each of said chambers to thereby allow said rams of said base portion to enter said chambers and to contact the piston in each said chamber.

8. A multichamber pump dispenser as in claim 1 wherein said lower shroud has an inwardly extending ledge on at least a part of an upper region thereof, said inwardly extending ledge of said lower shroud extending to a depth no greater than said longitudinal projections.

9. A multichamber pump dispenser as in claim 8 wherein said upper shroud has at least one locking projections on a lower surface thereof, said at least one locking projection contacting said inwardly extending ledge of said lower shroud to lock said upper shroud to said lower shroud.

10. A multichamber pump dispenser as in claim 9 wherein said upper shroud has at least one interference projection located upwardly from said at least one locking projection, said at least one interference projection contacting said lower shroud to maintain said upper shroud in a first position above said lower shroud, an increased force causing said interference projections to pass into said lower shroud to a second position.

11. A multichamber pump dispenser comprising a upper portion and a base portion, said upper portion comprising a plurality of chambers, each chamber having an upper end and a lower end, the upper end of each chamber connected by a delivery channel to an exit and another end of each said chamber closed by a piston adapted for slideable movement within each said chamber from said exit end to said upper end, an upper shroud at least partially surrounding said plurality of chambers, a lower region of said upper shroud having an inwardly extending ledge, said base portion comprising a foot and a plurality of upwardly projecting rams, each of said rams arranged for contact with one of said pistons, and a lower shroud surrounding said rams, an upper region of said lower shroud having an inwardly extending reinforcing ledge.

12. A multichamber pump dispenser as in claim 11 wherein said upper shroud has at least one locking projections on a lower surface thereof, said at least one locking projection contacting said inwardly extending ledge of said lower shroud to lock said upper shroud to said lower shroud.

13. A multichamber pump dispenser as in claim 12 wherein said upper shroud has at least one interference projection upwardly from said at least one locking projection, said at least one interference projection contacting said lower shroud to maintain said upper shroud in a first position above said lower shroud, an increased force causing said interference projections to pass into said lower shroud to a second position.

14. A multichamber pump dispenser as in claim 11 wherein said upper shroud has a plurality of transverse projections on an exterior surface thereof.

15. A multichamber pump dispenser as in claim 14 wherein said lower shroud has a plurality of longitudinal ribs on an inner surface thereof for contacting said plurality of transverse projections on said upper shroud when said upper shroud is slideably moved within said lower shroud.

16. A multichamber pump dispenser as in claim 14 wherein each of said longitudinal ribs is equidistant from a vertical axis of said base portion throughout about the length of each of said longitudinal ribs.

17. A multichamber pump dispenser as in claim 16 wherein there are at least about three longitudinal ribs on said lower shroud.

18. A multichamber pump dispenser as in claim 11 wherein said base lower shroud has a plurality of longitudinal ribs on an inner surface thereof.

19. A multichamber pump dispenser as in claim 18 wherein each of said longitudinal ribs is equidistant from a vertical axis of said base portion throughout the length of each of said longitudinal ribs.

20. A multichamber pump dispenser as in claim 19 wherein there are at least about three longitudinal ribs.

21. A multichamber pump dispenser as in claim 14 wherein said transverse projections on said upper shroud and said longitudinal ribs on said lower shroud contact in a sliding relationship upon the interfitting of said upper shroud into said lower shroud.

22. A multichamber pump dispenser as in claim 21 wherein said transverse projections encircle at least three sides of said upper shroud.

23. A multichamber pump dispenser as in claim 22 wherein each of said transverse projections is disposed in a wave pattern.

24. A multichamber pump dispenser as in claim 1 wherein said transverse projections encircle at least three sides of said upper shroud.

25. A multichamber pump dispenser as in claim 24 wherein a plurality of said transverse projections are continuous and are in a wave pattern.

26. A multichamber pump dispenser as in claim 1 wherein there is a spout on said upper portion, said spout at one end connected to an upper end of each chamber and open at an exit end, said deliver channel being within said spout and having a decreased cross-sectional area intermediate said one end and said exit end.

27. A multichamber pump dispenser as in claim 11 wherein there is a spout on said upper portion, said spout at one end connected to an upper end of each chamber and open at an exit end, said deliver channel being within said spout and having a decreased cross-sectional area intermediate said one end and said exit end.

* * * * *